United States Patent [19]

McWhirter et al.

[11] Patent Number: 4,593,378
[45] Date of Patent: Jun. 3, 1986

[54] DIGITAL SIGNAL PROCESSOR

[75] Inventors: John G. McWhirter; Edward R. Pike; David J. Watson, all of Malvern, England

[73] Assignee: Secretary of State, London, England

[21] Appl. No.: 466,313

[22] Filed: Feb. 14, 1983

[30] Foreign Application Priority Data

Feb. 15, 1982 [GB] United Kingdom ............... 8204382

[51] Int. Cl.⁴ .................. G06F 15/34; H03K 13/02
[52] U.S. Cl. ................................. 364/900; 364/728; 382/34
[58] Field of Search ............. 364/728, 200 MS File, 364/900 MS File; 382/34

[56] References Cited

U.S. PATENT DOCUMENTS 4,032,885 6/1977 Roth ........................... 382/34
4,414,641 11/1983 Jarrett ......................... 364/728

OTHER PUBLICATIONS

Computer. Des. (U.S.A.), vol. 16, No. 2, (Feb. 1972), Multichannel High Speed Correlator.
Electronic Circuit and Systems, (May 1979), vol. 3, No. 3, Flexible Digital Correlator, W. Matly, P. Howser.
J. Phys. E.: Sci. Instrum., vol. 14, 1981, (U.K.), A Quasi Real Time Autocorrelator, Wolfgang P. Lehmann.

Primary Examiner—Gareth D. Shaw
Assistant Examiner—Samir Jaser
Attorney, Agent, or Firm—Cushman, Darby & Cushman

[57] ABSTRACT

A digital signal processor has timing means for providing a succession of sample intervals in which incoming digital signals may have discrete values (e(o)). A serial delay such as a multi or single bit shift register progressively delays a digital signal giving a delayed signal (e(m)). An arithmetic section has a plurality of elements such as multi or single bit multipliers, or difference squares. Each element operates on non delayed signals (e(o)) and signals (e(m)) from an associated stage of the delay. An accumulating store has a plurality of channels each associated with and arithmetic element. Collectively the channels provide the required mathematical operation, e.g. auto or cross correlation function or structure function calculation. The interval of delay between channels is arranged to increase substantially geometrically e.g. by $\sqrt{2}$. The overall delay increase may be variable and geometric although increases between adjacent channels may be approximations to a geometric increase. A variable clip level circuit may be incorporated into the input to the serial delay. In one configuration the delay intervals may be adjusted to be the same between each channel.

13 Claims, 8 Drawing Figures

DIGITAL SIGNAL PROCESSOR

FIELD OF THE INVENTION

This invention concerns a digital signal processor in which a mathematical operation is carried out between non-delayed data and delayed data.

BACKGROUND OF THE INVENTION

Such processor may perform an auto or cross correlation function, or a structure function calculator. In an auto correlator a signal is divided into two channels. One channel signal is delayed and multiplied by the non-delayed channel signal. In a cross correlator a first signal is delayed and multiplied with a second non delayed signal. A structure function calculator determines the square of the difference between a delayed and a non delayed signal.

Digital signal processing enables highly accurate mathematical operations to be carried out on signals. Due to recent advances in logic speed complicated processing can be carried out in real time. Also advances in the statistical property theories of some events have simplified the processing of some functions. One example of this is in laser light scattering experiments, particularly in weakly scattering events.

Detailed investigation into the properties of light scattering led to the development of a single clipped digital correlator described in U.K. Patent Specification No. 1,290,336. This correlator allowed the processing of signals representing the arrival of single photons on a sensitive detector. From this a whole range of work has been made possible, for example, laser doppler velocimetry (LDV) where doppler shifts of laser light scattered off particles in a fluid can be processed to give particle velocity and turbulence.

In the above digital correlator a correlation function is accumulated from information obtained in successive sample interval channels. Increasing the number of sample channels allows further information to be obtained but results in increased equipment costs.

SUMMARY OF THE INVENTION

An object of this invention is to increase the amount of information obtained from digital signals with minimum increase in equipment costs.

According to this invention a digital signal processor for processing at least one digital signal comprises timing means for providing a succession of sample intervals in which incoming digital signals may have discrete values (e(o)), a serial delay for progressively delaying a digital signal by a sample interval to give a delayed signal (e(m)), an arithmetic section having a plurality of elements for performing a mathematical operation (g(m)) between differently delayed values of the delayed signal (e(m) and a non-delayed signal (e(o)), an accumulating store having a plurality of channels for accumulating successive compilations by each arithmetic section element, the channels collectively providing the required mathematical operation, and control means for controlling the passage of signals through the processor, characterized by a serial delay having a number (M) of delay stages much greater than the number (N) of channels in the accumulating store, each channel being associated with a different stage in the serial delay so that the intervals of delay between channels increases substantially geometrically.

The increase in intervals of delay between adjacent channels may be geometric or an approximation to a geometric increase such that the overall increase is substantially geometric. For example some non-adjacent channels may have an exact geometric increase in delay interval while intermediate channels have an approximately geometric increase. The overall geometric increase may be varied to suit experimental conditions. One useful interval of delay is a $\sqrt{2}$ increase. In one form the processor may have an interval of delay that is variable down to a linear delay interval.

The mathematical operation may be an auto or a cross correlation function or a structure function. To perform correlation functions the arithmetic section elements may be multi bit multipliers, or single bit multipliers such as coincidence gates (N)AND gates, etc. To perform a structure function the elements may be difference squarers.

The serial delay may be a serial in parallel out multi or single bit shift register.

The digital signals may be a series of digital values, multi or single bit, and may be a train of pulses representing single events separated in time.

BRIEF DESCRIPTION OF THE DRAWINGS

The invention will now be described, by way of example only, with reference to the accompanying drawings of which.

DETAILED DESCRIPTION OF THE INVENTION

Figure 1:
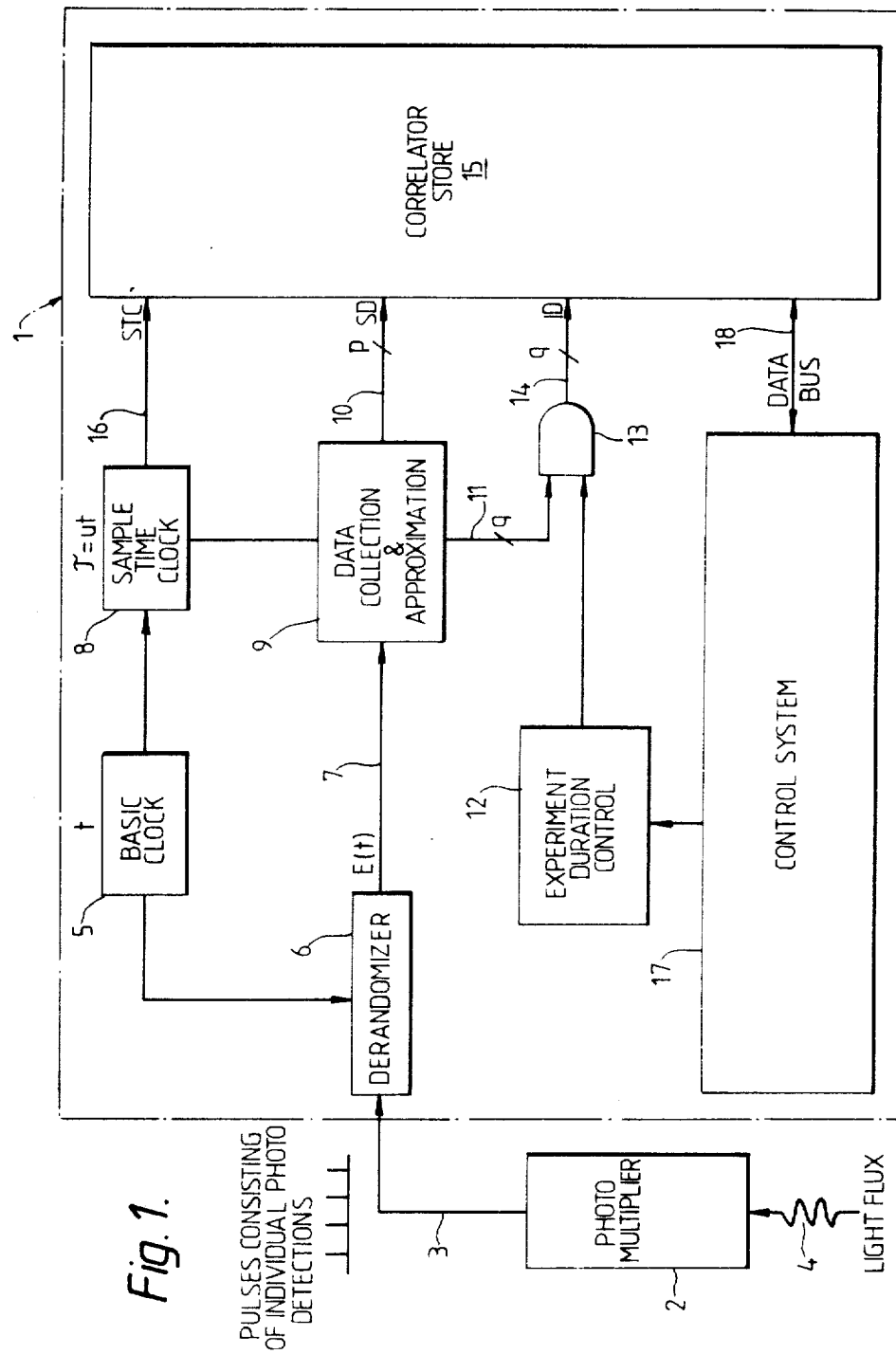
FIG. 1 is a schematic view of a correlator.

The correlator shown in FIG. 1, indicated by numeral 1, receives a signal from a photomultiplier 2. The photomultiplier output 3 is a stream of pulses each representing receipt of a single photon in a light flux 4.

A basic clock 5 has an interval t that all internal operations are related to; this interval t determines the maximum resolution of the complete system in time. Typically $t = 1$ microsecond.

Each incoming pulse 3 is synchronized to an interval of the basic clock 5 in a derandomizer circuit 6. Thus on output 7 the pulses have the same relationship to each other within interval t, and are of identical height and pulse width.

A sample time clock 8 divides the basic clock frequency to produce sample interval times $T = ut$, where u is an integer which is varied to suit experimental use. This allows the correlator to sample the derandomized data 7 on differing sample time intervals, changing the effective span and range of the correlator data in delay time space. During each sample interval ut the output pulses 7 from the derandomizer 6 are counted in a data collection unit 9. This unit 9 forms a multibit number e(o) representing the intensity (number of photons)

received by the photo multiplier in time ut. There are two outputs from the collection unit, a serial data output 10 and an immediate data output 11. For reasons related to the practical manufacture of correlators the unit 9 outputs are approximations of e(o) which usually limit the e(o) estimate to a smaller number of binary bits for each output. Thus the serial data output 10 is a p bit estimate of e(o) and the immediate data output 11 is a q bit estimate of e(o). The values of p, q can be integers from 1 to $\log_2 U$, U being the maximum practical value that the division ratio u takes.

Duration of an experiment is controlled by a duration logic circuit 12 whose output feeds one input of an AND gate 13; the other input to the gate 13 is the q bit information 11. Output 14 from the AND gate 13 is to a correlator store 15 which also receives input 16 from the sample time clock 8 and the p bit information 10. Typically the duration of an experiment is controlled by setting a fixed time interval or fixed number of sample times.

Overall control of the correlator 1 is by a microprocessor 17 which communicates with the store via a data bus 18.

Figure 2:
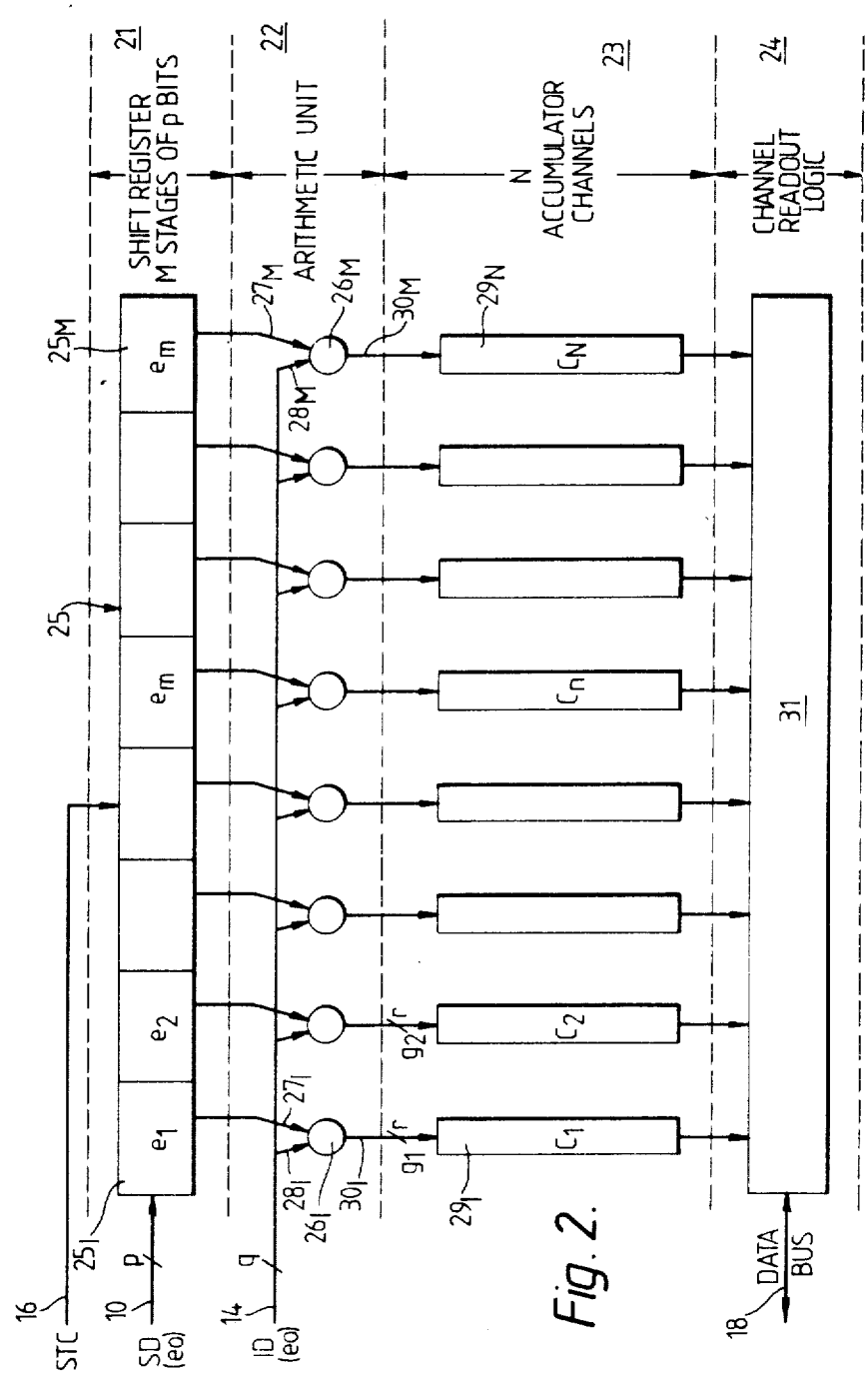
FIG. 2 is a block diagram of part of FIG. 1 showing a linear correlator store, similar in principle to that of U.K. Pat. No. 1,290,336.

The correlator store 15 is shown in greater detail in FIG. 2. It comprises four sections; a delay section 21, an arithmetic section 22, accumulator section 23, and read out logic section 24.

The delay 21 is a serial-in parallel-out shift register 25 having M stages of p bits. It receives p bit serial data under the control of clocking pulses from the sample clock.

The arithmetic section 22 may take several forms. For example it may comprise M multipliers 26 or difference squarers, Each having an input 27 from a different stage of the shift register 25 and an input 28 from the immediate data q 14. In one form of correlator as in U.K. Pat. No. 1,290,336 the data p is clipped by an adjustable level clipping circuit (not shown).

The accumulator section 23 comprises N accumulator channels 29 which each accumulate the outputs 30 from its respective part of the arithmetic section in each sample interval.

At the end of an experimental run the contents of each channel 29 are read out by the logic 31 to the microprocessor 17 via the data bus 18.

In operation data, in the form of a series of numbers, are fed as serial data 10 into the shift register 25 and as immediate data 14 direct to the arithmetic section 22.

For a correlation calculation the arithmetic section 22 employs multipliers 26, whose output 30, g(m) is e(o) x e(m), where e(m) is data from the m'th sample period before the current period. Each channel accumulator 29 C(m) takes successive values of g(m) and sums them to collectively produce G(m) the auto (or cross) correlation function. In a practical correlator the p bit values of e(m) and q bit values of e(o) are multiplied to obtain an r bit approximation to a multiplication.

To form a structure function each value g(m) is formed of $(e(o) = e(m))^2$.

In the correlator of U.K. Pat. No. 1,290,336 the input data is in the form of single bit numbers, logic 0 or 1. This simplifies the circuit components, particularly the arithmetic section where e.g. coincidence gates are used instead of multi bit multipliers 26. For many classes of exeriments single bit correlation is adequate. High speeds are readily obtained e.g. sample intervals of 20μ seconds.

The above form of correlator has been used with success for some time. However for some classes of experiments the function G(m) contains valuable information for large values of M. Such information could be obtained by increasing the number of shift register stages, multipliers and accumulators. However the cost would be very high. For example a typical correlator might have 26 channels, and useful information might be obtainable out to 2,000 or more channels.

One attempt to obtain this extra information used an addition shift register of length v words in the serial data input. Each shift register store then contains e(v+m) instead of e(m). This system cannot process e(o) and e(o+v) simultaneously. Therefore experiments must be repeated with and without the v word delay.

In prior art correlators adjacent channels C(n−1), C(n), C(n+1) . . . accumulate the correlation co-efficients of adjacent delay times e(m−1), e(m), e(m+1) . . . . In other words the channels are linearly disposed in delay space with an interval of one sample interval. These may be termed linear correlators.

It has now been found that almost all the useful information can be obtained by a correlator channel if the channels are disposed as a geometric progression in delay space. Theoretically the condition $m = d^n$ is required where n is the channel index and m is the delay signal estimate index, i.e. the channel n accumulates the correlation estimate G(m) according to the above relationship.

The value d is termed the dilation factor of the geometric progression and can theoretically vary as a continuous function. The value of d sets the resolution with which the correlator can resolve adjacent signal components. However, in a real experiment the statistical uncertainty of any correlation value G(n) sets a more fundamental information limitation to the resolution. Clearly dilation factors that are smaller than the fundamental data resolution result in channels accumulating correlated data. This means that the value of correlation co-efficient G(n) can be partially predicted by knowing other G values. This correlation implies a loss of information for the channel and hence a waste of the hardware.

All correlator instruments have a finite number of accumulators and hence measurement channels due to cost and size limitations. It is clearly a significant advantage to have this number of channels giving the maximum signal information. Experiments have shown that the dilation factor d that could be justified by no a priori knowledge of the information contained in a correlator store typically is of the order 2. Clearly as the correlator can do longer experiments thus improving the statistical accuracy the dilation factor can be reduced but it rarely falls below $\sqrt{2}$.

If the user has prior knowledge of the functional form of the data then this information may be used in a number of ways to enhance the effective statistical accuracy of the correlator data and hence a smaller dilation factor can be useful, typically $d = \sqrt{2}$ is appropriate. The final limit to a reduction of dilation factor in any practical correlator is to revert to the current linearly spaced store.

The theoretical basis for using a geometric progression of delay interval is as follows:

A class of correlation functions, $g(\tau)$ which is of importance in the analysis of optical and other signals is described by the equation $$g(\tau) = (Kp)(\tau) = \int_0^\infty K(\nu,\tau)p(\nu)d\nu \quad (1)$$

Here $\nu$ is a physical variable, such as velocity in laser velocimetry or linewidth in molecular diffusional light scattering, which gives rise to a "response" $K(\nu,\tau)$, described by the integral operator K, in the correlator instrument. In the presence of a "spectrum" of $\nu$, $p(\nu)$, such as arises with turbulent velocities of polydisperse molecular systems, the correlation function is given by equation (1) and the data reduction procedure is required to extract $p(\nu)$ from the measured $g(\tau)$.

In the case where $$K(\nu,\tau) = K(\nu\tau) \quad (2)$$

that is to say that K is a function of the product $(\nu\tau)$ only, which is true in both of the examples quoted above and in many other cases of interest, equation (1) has recently been solved (McWhirter and Pike 1978 *J Phys A* 11 1729) by the discovery of its eigenvalues, $\phi_\omega(\nu)$, and eigenfunctions, $\lambda_\omega$. These functions transform into themselves in equation (1) ie $$\int_0^\infty K(\nu\tau)\phi_\omega(\nu)d\nu = \lambda_\omega Q_\omega(\tau) \quad (3)$$

and form a complete orthonormal basis for expression of the solution.

Thus we may write, in terms of coefficients $a_\omega$ to be determined, $$p(\nu) = \int_{-\infty}^{\infty} a_\omega \phi_\omega(\nu)d\omega \quad (4)$$

which gives for the correlation function $$g(\tau) = \int_{-\infty}^{\infty} \lambda_\omega a_\omega \phi_\omega(\tau)d\omega \quad (5)$$

It can be shown that for operators K which are also compact the eigenvalues, $\lambda_\omega$, may be ordered in a decreasing sequence accumulating to zero so that contributions $a_\omega$ to $g(\tau)$ for values of $\omega$ greater than $\omega_{max}$, where $\omega_{max} \sim \epsilon$ determined by experimental noise $\epsilon$, will not be recoverable since their contribution in the integral of eq (5) will be less than the noise on the LHS. The expansions of equations (4) and (5) must therefore be truncated at some value $\omega_{max}$. Using also the explicit results of McWhirter and Pike for the functions $\phi_\omega$ it can be shown then that $$g(\tau) = \int_{-\omega_{max}}^{\omega_{max}} \lambda_\omega \beta(\omega)\tau^{-\frac{1}{2}}e^{i\omega\log\tau}d\omega \quad (6)$$

where $\beta$ is a combination of the $a_\omega$'s determined by $K(\nu\tau)$.

Making the substitutions $$\tau = e^y \quad (7)$$

and $$G(\log(\tau))d(\log(\tau)) = g(\tau)d\tau \quad (8)$$

there results $$e^{-y/2}G(y) = \int_{-\omega_{max}}^{\omega_{max}} \lambda_\omega \beta(\omega)e^{i\omega y}d\omega \quad (9)$$

The function on the LHS of (9) is thus a band limited Fourier transform for which the Nyquist sampling theorem applies. That is to say that the function may be fully reconstructed from the knowledge of its values at $\log \tau_n$, $\log \tau_{n+1}$ etc separated by $\pi/\omega_{max}$ ie at values $$\tau_{n+1} = \tau_n \exp(\pi/\omega_{max}) = \tau_{n-1}\exp(2\pi/\omega_{max}) \text{ etc} \quad (10)$$

or $$\tau_{n+1} = d\tau_n = d^2\tau_{n-1} \text{ etc}$$

ie $$\tau_n = d^n \quad (11)$$

where d is a dilation factor obeying $$\omega_{max} = \pi/\log d \quad (12)$$

It is clear that the inverse function $p(\nu)$ may therefore also be specified, within the accuracy of the experiment, by knowledge of $g(\tau)$ at these "exponentially samples" points.

Calculations by Bertero and Pike (Optica Acta, to be published) give values of d for typical noise levels for the particular case of $$K(\nu\tau) = e^{-\nu\tau} \quad (13)$$

with a priori knowledge of the support of the function $p(\nu)$. This kernel applies to the polydispersity analysis of molecular sizes by photon correlation. Suitable values of d cover the range $\sqrt{2} < d < 2.5$. For other kernels smaller values of d will be possible. In particular, for the laser velocimetry kernel $$K(\nu\tau) = \left(1 + \frac{m^2}{2}\cos\nu\tau\right)e^{-\nu^2\tau^2/\sigma^2} \quad (14)$$

the dilation factor will go to unity (requiring linear spacing in $g(\tau)$) as $\sigma \to \infty$ which may be sufficiently closely approximated in some low speed velocimetry experiments.

Figure 3:
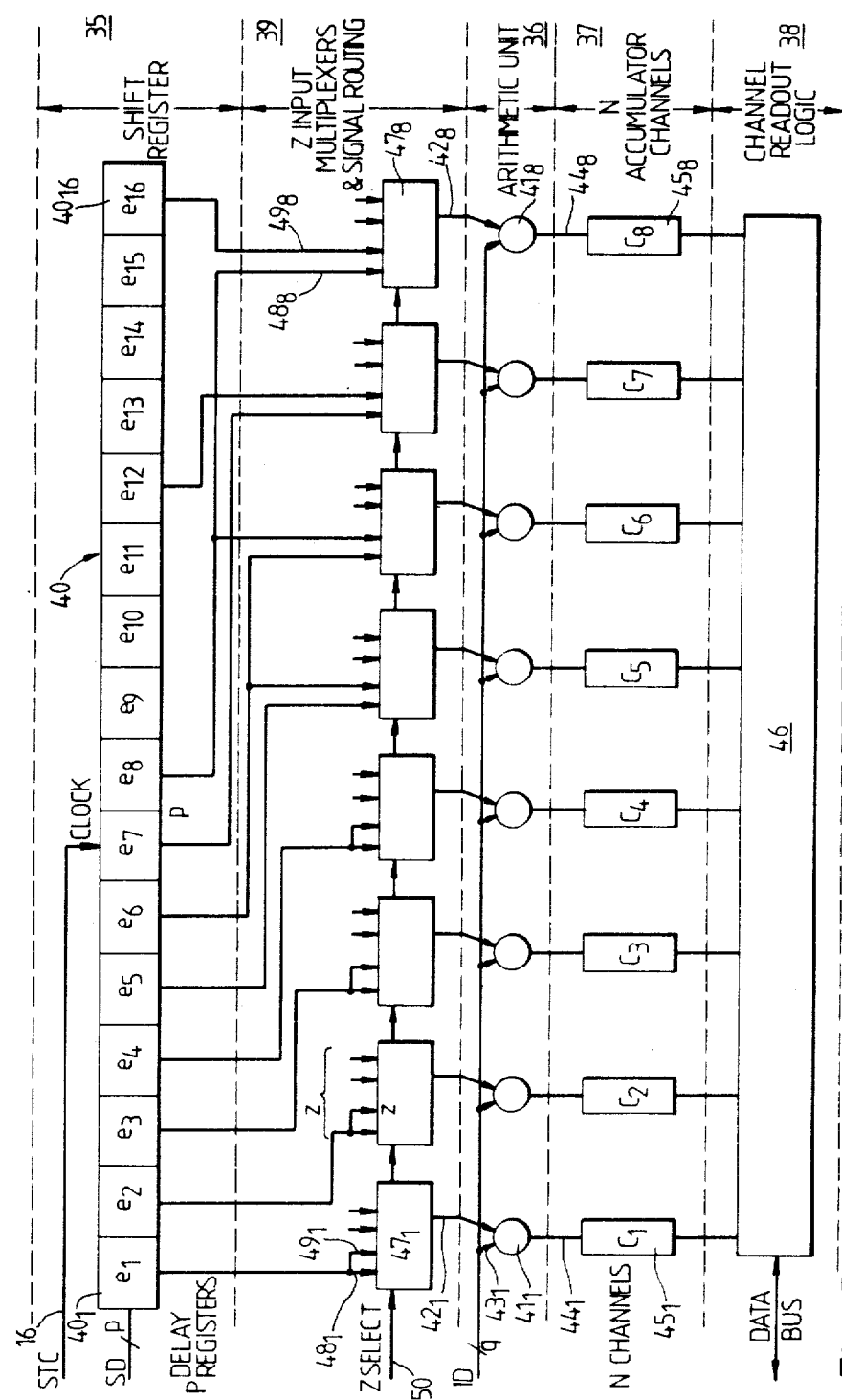
FIG. 3 is a block diagram of correlator stores having an overall geometric progression of sample period channels.

To provide a geometric sampling delay correlator the correlator store of FIG. 3 may be used in the general correlator of FIG. 1. This store has similarities to that of FIG. 2 in having a delay section 35, arithmetic section 36, accumulators 37, and channel read out 38; additionally it has a signal routing section 39.

The delay section 35 comprises a serial in/parallel out shift register 40 having M=16 stages each p bits. Serial data is applied to the first stage 40, of the shift register 40 and clocked by pulses.

The arithmetic section 36 comprises eight p bit multipliers 41 each having one input 42 from the shift register 40, as explained below, and one input 43 from the immediate q data. Output 44 from each multiplier 41 is sent to one of eight accumulators 45. The collective contents of the accumulators 45 is read out by read-out logic 46 to the microprocessor 17. When used to determine a structure function the multipliers 41 are replaced by difference square circuits $(e(m)-e(o))^2$.

The routing section 39 enables the stores to be arranged as an eight channel linear correlator, or a geometric delay correlator by a simple switching signal.

This routing section 39 comprises eight Z:1 multiplexers 47 whose output form the serial data input 42 to the multipliers 41. In this particular construction the shift register 40 stages 1 to 8 are connected to the first inputs 48 of the eight multiplexers 47. The multiplexers $47_{1-4}$ have their first 48 and second 49 inputs connected together. Shift register 40 stages are connected to the second input 49 of the multiplexers 47 as follows:

stage 6 to multiplexers $47_5$
stage 8 to multiplexer $47_6$
stage 12 to multiplexer $47_7$, and
stage 16 to multiplex $47_8$.

Control input 50 of each multiplexer 47 Z select determines which input is connected to the output. In the illustrated case the Z select is either the number one or two. When control signal Z=1 the consecutive register stages 1 to 8 are connected to channels $45_{1-8}$ and the correlator acts as linear correlator as described with reference to FIG. 2. When control signal Z=2 is applied register stages 1, 2, 3, 4, 6, 8, 12, 16 are respectively connected to channels $45_{1-8}$.

Thus a linear or geometric G(m) is obtainable by the read out logic as required.

The simple case of FIG. 3 is easily extended to provide long delays e.g. M=8192 stages. With suitable connection between register stages and the various Z inputs of the multiplexers different dilation values d are obtained by appropriate Z select control pulses.

One particularly useful dilation d is $\sqrt{2}$, i.e. $m = 2^{n/2}$. It is easy to calculate the exact delays necessary to implement $d=\sqrt{2}$ for varying numbers of channels. However only integer values are available from registers and so approximations are necessary. The table below shows how $d=\sqrt{2}$ may be implemented.

| n number of channels | m ideal delay | m nearest integer | m practical |
|---|---|---|---|
| 1 | 1 | 1 | 1 |
| 2 | 2 | 2 | 2 |
| 3 | 2.82 | 3 | 3 |
| 4 | 4 | 4 | 4 |
| 5 | 5.66 | 6 | 6 |
| 6 | 8 | 8 | 8 |
| 7 | 11.31 | 11 | 12 |
| 8 | 16 | 16 | 16 |
| 9 | 22.6 | 22 | 24 |
| 10 | 32 | 32 | 32 |
| 11 | 44.25 | 45 | 48 |
| 12 | 64 | 64 | 64 |
| 13 | 90.5 | 90 | 96 |
| 14 | 128 | 128 | 128 |
| 15 | 181.02 | 181 | 192 |
| 16 | 256 | 256 | 256 |

From this table it can be seen that an eight channel store uses delay periods of 1, 2, 3, 4, 6, 8, 12, and 16 as shown in FIG. 3.

In order to reduce the hardware complexity it is not desirable to have Z large and hence finesse in the d factor should be avoided unless essential. To this end it should be noted that implementing a dilation factor $\sqrt{2}$ also contains the dilation factor 2 and 4 etc., as subsequences. Thus a sampling of $\sqrt{2}$ contains these higher dilation factors at the expense of needing more channels than are strictly necessary.

There is a practical limit in any experiment with correlators to the maximum delay interval M that can be measured. As M increases the delay time between e(O) and e(M) will eventually become of the order of the time period of low frequency interfering effects inherent in all experiments (currently conducted) using digital correlators. When the delay gets this large the correlator channels are again no longer integrating useful information. Any signal components at these delay times become dominated by the interfering signals on the same time scale. It is important to realize that once a geometric progression has extended to a certain value M(max) then more channels disposed at further delays are once again of little or no information value.

It is clear that the actual value of M(max) must be dependent on the quality of the experiment giving the data E(t). However, experience of the prior art shows that a correlator store length of 4096 delay intervals represents an exceptional maximum delay that avoids the low frequency interfering signals.

Now consider the question of higher dilation ratios than the example given of $\sqrt{2}$, 2 for example. A 26 channel progression in $d = \sqrt{2}$ will give M=8192. To dispose 26 channels at a dilation factor of 2 would give M=67,000,000 (approx). It should be clear that once 26 channels have been disposed on a $\sqrt{2}$ dilation factor all useful values of the d=2 succession are contained within it by taking every alternate channel for the $d=\sqrt{2}$ succession. Hence there is no need to directly implement successions that are multiples of a dilation factor already disposed.

As the dilation factor becomes smaller the practical approximations needed to achieve the factor become closer to a linear progression. For example, in the $\sqrt{2}$ approximation the first four channels are linearly disposed by practical necessity as they represent the nearest integer value to the succession desired. For a succession of $2^{\frac{1}{4}}$ the first 8 channels would be linear etc. Thus it is of obvious value for the limiting value of d(min) that one of the Z successions is the normal linear sampling.

It is thus apparent that the savings in hardware available by geometric spacing of the channels is immense. The $\sqrt{2}$ succession previously discussed represents a typical experiment's useful resolution. A 26 channel correlator has the same information capacity as the equivalent 8192 channel linear store, a saving of 97% of channel accumulator hardware. As conventional linear stores have never been manufactured at such lengths with a 100% processing efficiency the geometric correlator, with 26 channels, will make measurements possible over a dynamic range not previously possible.

Figure 4:
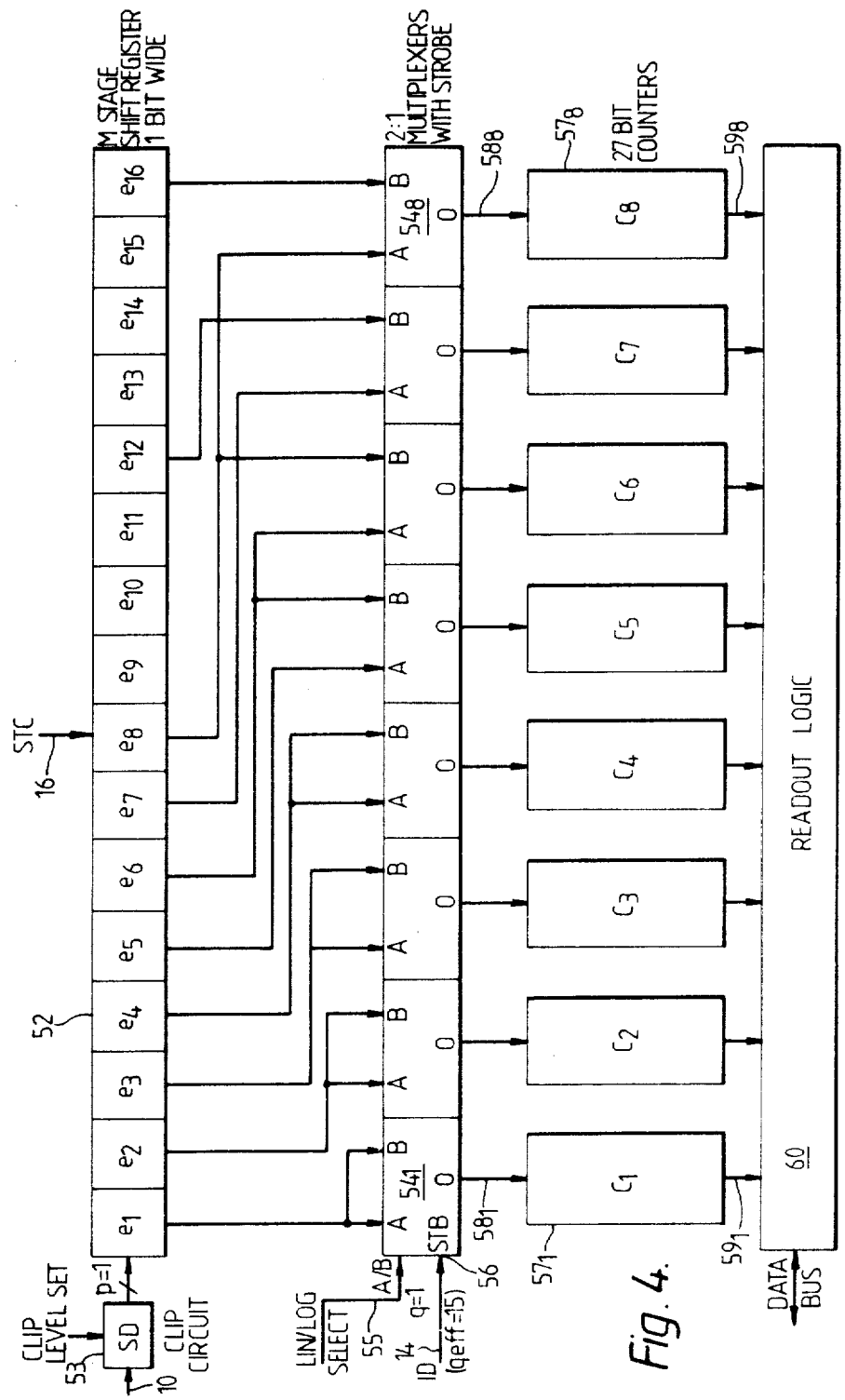
FIG. 4 is a simple alternative to that of FIG. 3.

FIG. 4 shows a correlator capable of using single clipped data, e.g. data as taught in U.K. Pat. No. 1,290,336.

The correlator comprises an M stage shift register 52 one bit wide clocked by the sample time clock 8. As shown M=16, in a practical case M=8192 but may be more or less. Serial data 10 is clipped to a single bit i.e. logic one or zero by a clip circuit 53 such as a counter with overflow, reset at the end of each sample interval ut. The clip circuit 53 gives a logic one output whenever a number of pulses equalling or exceeding an adjustable value are received in an interval ut. Receipt of a number of pulses below the set level result in logic zero output. A train of logic ones and zeros is thus clocked along the shift register 52 and forms the clipped delayed signal e(m).

An arithmetic section comprises N 2:1 multiplexers 54 each having inputs A and B, an A or B select control 55, a strobe input 56 and an input o. As shown N=8, in a practical example N=26. Shift register 52 stages 1 to 8 are connected to the A input of multiplexers 54 1 to 8. Shift register 52 stages 1, 2, 3, 4, 6, 8, 12, 16 are respectively connected to the B input of multiplexers 54 1 to 8.

The accumulation section comprises N channels 57 such as 27-bit counters each having an input 58 from a multiplexer 54 and an output 59 to read out logic 60 and the microprocessor 17. As shown N=8, in a practical example N=26 but may be more or less.

In operation as a linear correlator the A/B select 55 is set to receive inputs A of the multiplexers 54. Non delayed immediate data 14, in the form of logic ones and/or zeros in each sample interval are applied to the strobe input 56. The multiplexers 54 thus each perform the function $g(m)=e(o)\times e(m)$—single clipped, i.e. the number of coincidences of a logic one at an associated register stage and a strobe input. After a suitable period the contents of the counters 57 collectively store the single clipped function G(m) that can be clocked out to the microprocessor 17.

Figure 5:
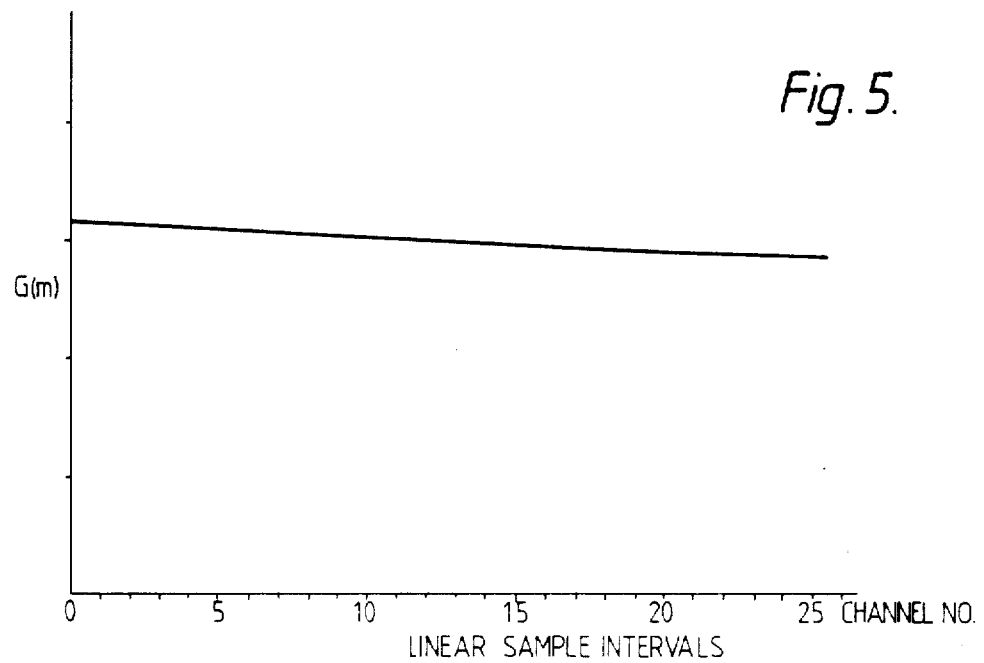
FIG. 5 is a graph of a typical correlation function obtained on a linear correlator of FIG. 2 or 4 when arranged as a linear correlator.

FIG. 5 shows a typical correlation function for a 26 channel linear correlator.

In operation as a geometric delay interval the A/B select 55 is set to input B. The clipped signal delayed by intervals of 1, 2, 3, 4, 6, 8 12, 16 is correlated with immediate data in the multiplexers 54 and the correlation values counted in each channel 57.

Figure 6:
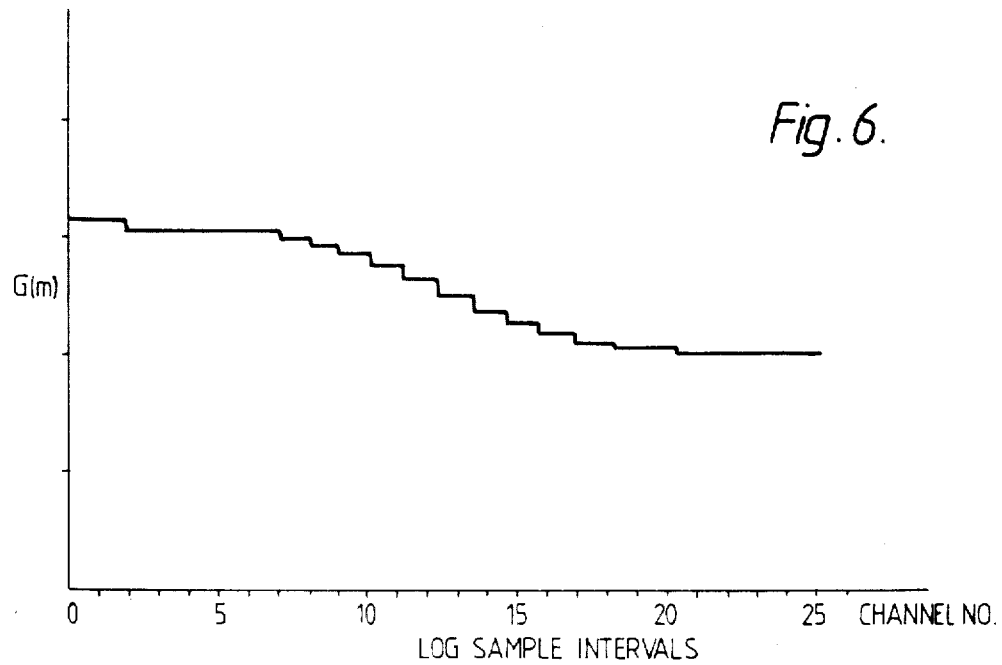
FIG. 6 is a graph of a typical correlation function obtained on the correlator of FIG. 3 or 4 drawn to a logarithmic scale.

FIG. 6 shows a typical correlation function for a 26 channel processor connected with geometrically increasing sample intervals drawn to a log scale. The part of the correlation function obtained when used as a linear correlator is seen to be a small part of the possible information present.

Use of the strobe input 56 allows multi-bit immediate data to be carried on a single line thus reducing hardware. In one example the basic clock 5 period $t=1$ microsecond, $u=1$ to 32767, maximum sample interval, $ut-32$ milliseconds.

Figure 7:
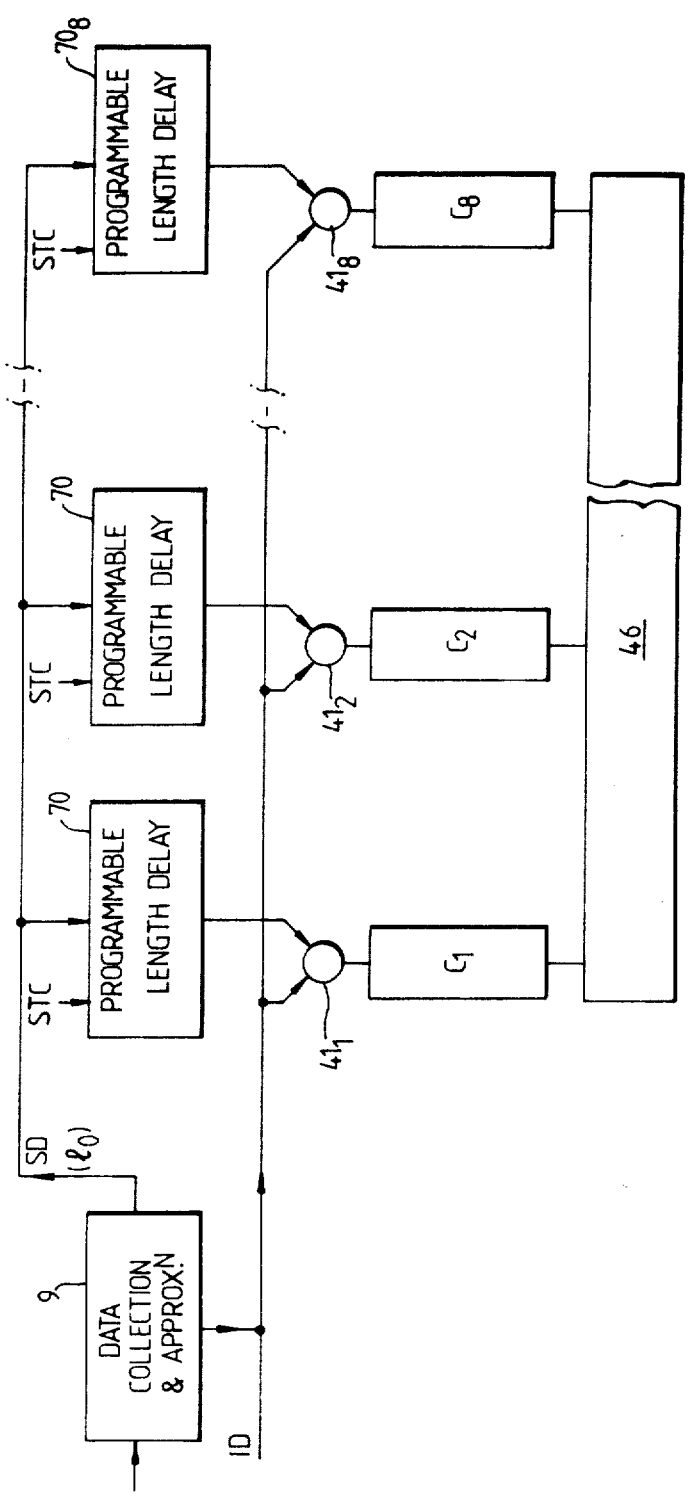

Other forms of implementing geometrically spaced delay intervals are possible for example;

FIG. 7 is a modification of FIG. 3, with like elements given like reference numerals. As shown each accumulator channel $C_1$ to $C_8$ has an independent delay register $70_1$ to $70_8$ of programmable length allowing any channel n to occupy any m value. Then each channel $C_1$ to $C_8$ can be programmed independently to take up any integer approximation to a dilation factor d with the limits of M set by the size of the delay register $70_1$ to $70_8$.

Figure 8:
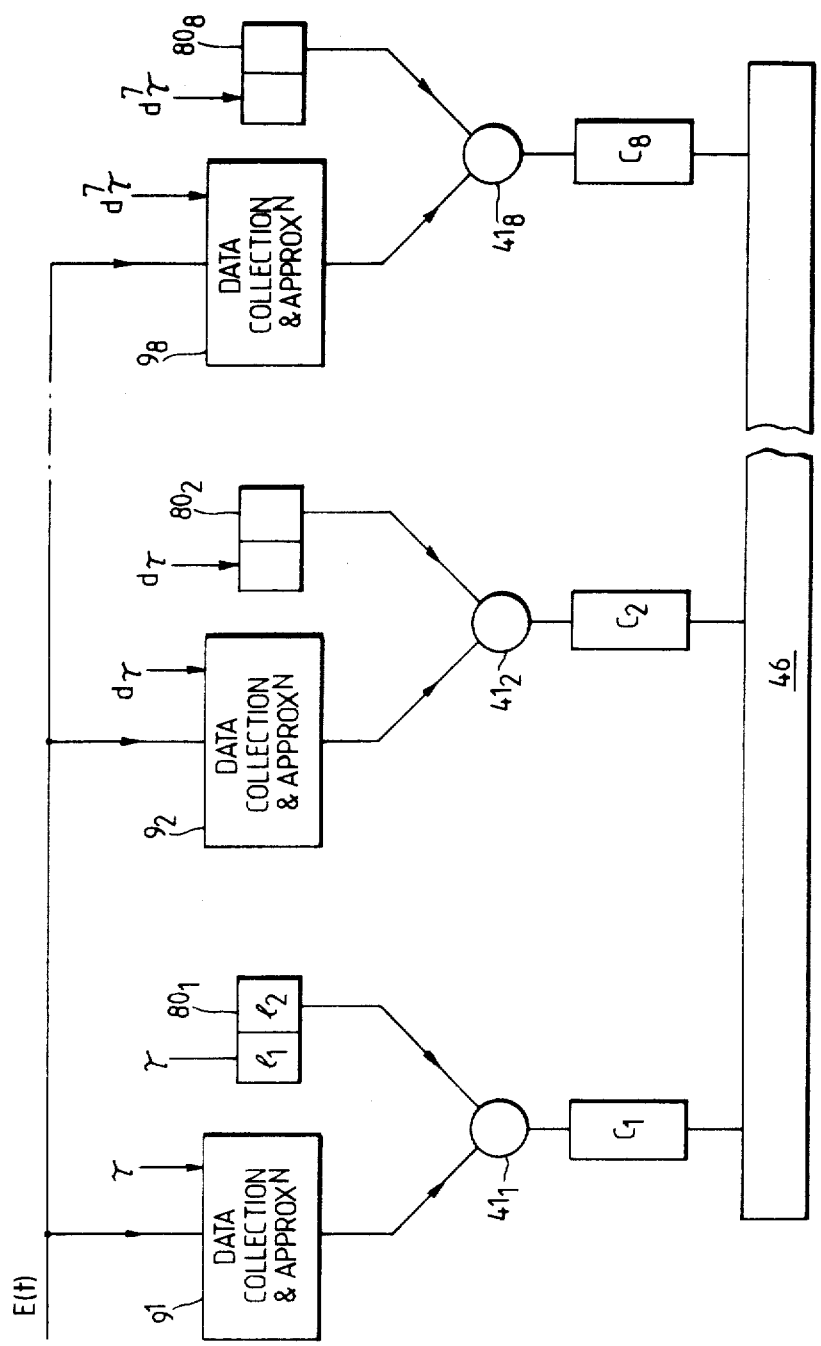

FIG. 8 is another modification of FIG. 3 with like elements given like reference numerals. Each accumulator channel $C_1$ to $C_8$ is associated with a multiplier $41_1$ to $41_8$, and a delay $80_1$ to $80_8$ forming eight separate correlator systems. Each delay $80_1$ to $80_8$ is a two shift register giving an output e(2). The sample times T of each correlator $C_1$ to $C_8$ are arranged in relation to each other to form a similar integer approximation to a geometric progression in T. Each correlator requires separate Data Collection and Signal approximation logic $9_1$ to $9_8$ due to the linear rise in the effective p and q values that occur as the T value increases geometrically. For this reason each channel requires a second channel accumulating diagnostic information that enables all correlator data to be exactly normalized to a common scale. In the case of the single clipped correlator, for example, a separate channel keeping track of the number of samples having a clipped outcome is necessary.

I claim:

1. A digital signal processor for processing at least one digital signal, said processor comprising:
    timing means for receiving an incoming digital signal and for providing a succession of sample intervals containing discrete values forming a digital signal;
    delay means connected to said timing means for progressively delaying said digital signal by delay intervals to provide a delayed signal;
    an arithmetic section having a plurality of elements, each element arranged to receive from said delay means a differently delayed value of the deplayed signal, each element being connected to receive said digital signal, said plurality of elements performing a mathematical operation between said digital and delayed signals;
    an accumulator section having a plurality of channels each connected to one of said elements for accumulating successive compilations by said elements, the channels collectively providing the required mathematical operation;
    means for providing to each of said elements from said delay means a differently delayed signal such that the delay interval or sample interval between successive channels increases substantially geometrically, and
    control means for controlling the passage of signals through the processor.

2. The processor according to claim 1 wherein the delay means is a serial shift register having a number of delay stages greater than the number of elements in the arithmetic section.

3. The processor according to claim 16 wherein connections to said different stages are arranged so that the overall increase in intervals of delay between channels is a $\sqrt{2}$ geometric increase.

4. The processor according to claim 2 including means connected between the delay means and arithmetic section for varying the connections between said elements and said delay stages to vary the interval of delay between channels.

5. The processor according to claim 4 wherein the means for varying the delay is arranged to connect successive delay stages to successive elements of the arithmetic section.

6. The processor according to claim 1, further including means connected between the timing means and the delay means for clipping digital signals applied to said delay means.

7. The processor according to claim 1 wherein the elements of the arithmetic section are multibit multipliers.

8. The processor according to claim 1 wherein the elements of the arithmetic section are single bit multipliers.

9. The processor according to claim 1 wherein the elements of the arithmetic section are difference squarers.

10. The processor according to claim 1 wherein the serial delay includes multibit serial-in parallel-out shift register.

11. The processor according to claim 2 wherein the serial delay includes single bit serial-in parallel-out shift registers.

12. The processor according to claim 1 comprising programmable length delay registers; one associated with each channel.

13. The processor according to claim 1 comprising data collection and approximation logic associated with each channel, and means for clocking each channel at a different sample interval rate.

* * * * *